(12) United States Patent
Watanabe et al.

(10) Patent No.: US 8,646,417 B2
(45) Date of Patent: Feb. 11, 2014

(54) COOLING APPARATUS FOR INTERNAL COMBUSTION ENGINE

(75) Inventors: Tetsuji Watanabe, Toyota (JP); Fujio Inoue, Kiyose (JP)

(73) Assignees: Nippon Thermostat Co., Ltd., Kiyose-shi, Tokyo (JP); Toyota Jidosha Kabushiki Kaisha, Toyota-shi (JP)

( * ) Notice: Subject to any disclaimer, the term of this patent is extended or adjusted under 35 U.S.C. 154(b) by 203 days.

(21) Appl. No.: 13/040,659

(22) Filed: Mar. 4, 2011

(65) Prior Publication Data
US 2011/0214626 A1      Sep. 8, 2011

(30) Foreign Application Priority Data
Mar. 4, 2010   (JP) ................................. 2010-047341

(51) Int. Cl.
*F01P 7/14*     (2006.01)

(52) U.S. Cl.
USPC ................ 123/41.1; 123/41.58; 123/41.59; 123/41.08

(58) Field of Classification Search
USPC ............. 123/41.1, 41.01, 41.08, 41.58, 41.59
See application file for complete search history.

(56) References Cited

U.S. PATENT DOCUMENTS

| | | | | |
|---|---|---|---|---|
| 4,126,114 A * | 11/1978 | Davis | ........................ | 123/198 D |
| 5,727,729 A * | 3/1998 | Hutchins | ...................... | 236/34.5 |
| 6,460,492 B1 * | 10/2002 | Black et al. | .................. | 123/41.1 |
| 6,592,046 B2 * | 7/2003 | Suda | ............................. | 236/34.5 |
| 6,764,020 B1 * | 7/2004 | Zhao et al. | .................. | 236/68 R |
| 6,966,278 B2 * | 11/2005 | Takahashi | ..................... | 123/41.1 |
| 7,490,581 B2 * | 2/2009 | Fishman | ....................... | 123/41.1 |
| 2002/0104892 A1 * | 8/2002 | Suda | .......................... | 236/101 C |
| 2002/0195289 A1 * | 12/2002 | Schneider et al. | ............ | 180/229 |
| 2008/0251591 A1 * | 10/2008 | Miyamoto et al. | .......... | 236/99 K |

FOREIGN PATENT DOCUMENTS

| | | | |
|---|---|---|---|
| JP | 61-194733 U | 12/1986 |
| JP | 08-319831 A | 12/1996 |
| JP | 09-280050 A | 10/1997 |
| JP | 2003-222264 A | 8/2003 |
| JP | 2010-001739 A | 1/2010 |

OTHER PUBLICATIONS

Japanese Office Action dated Apr. 16, 2012, issued in corresponding Japanese Patent Application No. 2010-047341 (2 pages).
Japanese Office Action dated Dec. 27, 2011, issued in corresponding Japanese Patent Application No. 2010-047341.

* cited by examiner

*Primary Examiner* — Noah Kamen
*Assistant Examiner* — Long T Tran
(74) *Attorney, Agent, or Firm* — Westerman, Hattori, Daniels & Adrian, LLP

(57) ABSTRACT

A cooling apparatus for an internal combustion engine is provided in which a temperature detecting tip of a temperature sensor is arranged in a position where flow of a coolant is smooth, to thereby improve a measurement accuracy of coolant temperature. A thermoelement assembly 13 and the temperature sensor 17 which detects the temperature of the coolant are accommodated in the housing 11 arranged at a return channel of the coolant which flows from a radiator to a coolant inflow part of the engine. The temperature detecting tip 17a of the temperature sensor 17 is arranged to face the inside of a circulation hole 12 of the housing 11 between a valve body 23 which constitutes the thermoelement assembly and a frame support part formed in the circulation hole 12 of the housing 11.

6 Claims, 6 Drawing Sheets

COOLING APPARATUS FOR INTERNAL COMBUSTION ENGINE

BACKGROUND OF THE INVENTION

1. Field of the Invention

The present invention relates to a cooling apparatus for an internal combustion engine provided with a thermostat device which is arranged in a circulation channel for circulating a coolant between the internal combustion engine (hereinafter also referred to as engine) of an automobile (for example) and a radiator and variably controls a temperature of the above-mentioned coolant.

2. Description of the Related Art

A thermostat device is provided with a thermoelement including therein a thermal expansion material which detects a temperature change of a coolant flowing through the inside of a circulation channel between an engine and a radiator to thereby expand and contract. A valve body is opened and closed by changes in volume due to the expansion and contraction of the thermal expansion material, serving a function to maintain the coolant at a predetermined temperature. Conventionally, various structures are known.

Further, an arrangement is proposed in which a thermostat assembly including the above-mentioned thermoelement is accommodated in a housing connected to the above-mentioned circulation channel and a temperature sensor for detecting the temperature of the coolant is provided in the above-mentioned housing. According to this arrangement, since the temperature of the coolant can be detected with the above-mentioned temperature sensor, the accuracy of the temperature control of the engine can be further improved using temperature information on the coolant.

As described above, the thermostat device in which the thermostat assembly and the temperature sensor are accommodated in one housing is disclosed in a prior art document, Japanese Patent Application Publication No. 2003-222264 (patent document 1).

Incidentally, according to the thermostat device disclosed in the above-mentioned prior art document, a support part (frame hook) of a spring support frame used for incorporating a thermoelement assembly into the housing serves as flow resistance, therefore there remains a problem of generating disorder and stagnation in the flow of the coolant.

Further, according to the apparatus disclosed in the above-mentioned prior art document, a temperature detecting tip of the temperature sensor is arranged near the frame hook which projects in the circulation hole of the above-mentioned housing, so that the temperature sensor measures a coolant temperature of a portion where disorder is generated in the flow of the coolant by the frame hook. Thus, it is not possible to raise the measurement accuracy of the coolant temperature, leaving room for improvement.

Furthermore, the temperature sensor provided for the above-mentioned thermostat device detects the coolant temperature (water temperature at outlet) from an engine coolant outlet, so as to be used for engine control, heater control, etc. However, in these days, the optimal temperature control of the coolant is required in terms of improving fuel consumption of the engine, and it is necessary to detect the coolant temperature at an engine coolant inflow part or around the thermostat which carries out the temperature control of the coolant.

SUMMARY OF THE INVENTION

The present invention arises in view of recent technical needs as described above, and aims to provide a cooling apparatus for an internal combustion engine which can correctly detect a temperature of a coolant flowing into an engine and also perform temperature control of the coolant by means of a conventional thermostat.

It is a further object to provide a cooling apparatus for an internal combustion engine in which, without increasing flow resistance by the presence of a thermostat, a temperature detecting tip of a temperature sensor is arranged in a position where flow of a coolant is smooth, so that measurement accuracy of a coolant temperature is improved further.

The cooling apparatus for the internal combustion engine in accordance with the present invention made in order to solve the above-mentioned problems is used for a cooling apparatus for an internal combustion engine in which a circulation channel of a coolant is formed between a fluid passage formed in the internal combustion engine and a radiator. It is a cooling apparatus for an internal combustion engine in which a thermoelement assembly and a temperature sensor which detects a temperature of the coolant are accommodated in a housing arranged at a return channel of the coolant which flows from the above-mentioned radiator to a coolant inflow part of the above-mentioned internal combustion engine.

The above-mentioned thermoelement assembly is provided with a thermoelement including therein a thermal expansion material which expands and contracts in response to a temperature of the coolant, a valve body which opens and closes a circulation hole in the above-mentioned housing based on the expansion and contraction of the thermal expansion material in the above-mentioned thermoelement, a spring member which biases the above-mentioned valve body in a direction to close the valve, and a spring support frame which supports an end of the above-mentioned spring member. It is arranged that a lock portion formed in the above-mentioned spring support frame is locked to a frame support part formed in the circulation hole of the above-mentioned housing so that the above-mentioned thermoelement assembly is incorporated into the above-mentioned housing. A temperature detecting tip of the above-mentioned temperature sensor is arranged to face the inside of the circulation hole of the housing between the above-mentioned valve body which constitutes the thermoelement assembly and the frame support part formed in the circulation hole of the above-mentioned housing, and to be away from the above-mentioned spring support frame.

In this case, preferably, the temperature detecting tip of the above-mentioned temperature sensor is arranged so as to face the inside of the above-mentioned circulation hole opposite to the inlet which is for the coolant from the above-mentioned radiator side and formed in the above-mentioned housing.

Further, it is preferably arranged that the above-mentioned temperature sensor is fitted into the support tube 18 formed at the above-mentioned housing to be detachable in an axial direction of the support tube.

Furthermore, in the preferred embodiments, it is arranged that a fluid inlet through which the coolant from a coolant outlet of the above-mentioned internal combustion engine flows not via the above-mentioned radiator communicates with the circulation hole of the housing between the above-mentioned valve body and the frame support part.

According to the thermostat device used for the cooling apparatus for the internal combustion engine in accordance with the present invention, since it is arranged that the thermoelement assembly and the temperature sensor which detects the temperature of the coolant are accommodated in the housing arranged at the return channel of the coolant which flows from the radiator to a coolant inflow part of the internal combustion engine, the above-mentioned temperature sensor can accurately detect the temperature of the coolant which flows into the engine, and can further contribute to improvement in fuel consumption of the engine etc. by using this information.

Further, the temperature detecting tip of the temperature sensor is arranged so that it may face the inside of the circulation hole of the housing between the above-mentioned valve body which constitutes the thermoelement assembly and the frame support part formed in the circulation hole of the above-mentioned housing. Therefore, it is possible to solve the above-mentioned technical problems in the conventional apparatus disclosed in the prior art document and contribute to improving the measurement accuracy of the coolant temperature further.

In addition, since the above-mentioned temperature sensor is arranged to fit into the support tube formed at the above-mentioned housing and to be detachable in the axial direction of the support tube, it is possible to cancel the sealing by somewhat pulling the above-mentioned temperature sensor out of the inside of the above-mentioned support tube in the axial direction. Thus, it can also serve the function to remove air at the time of filling the coolant into the above-mentioned circulation channel. Further, it may also function as a drain cock at the time of draining the coolant from the above-mentioned circulation channel in order to change the coolant.

DESCRIPTION OF THE PREFERRED EMBODIMENTS

Figure 1:
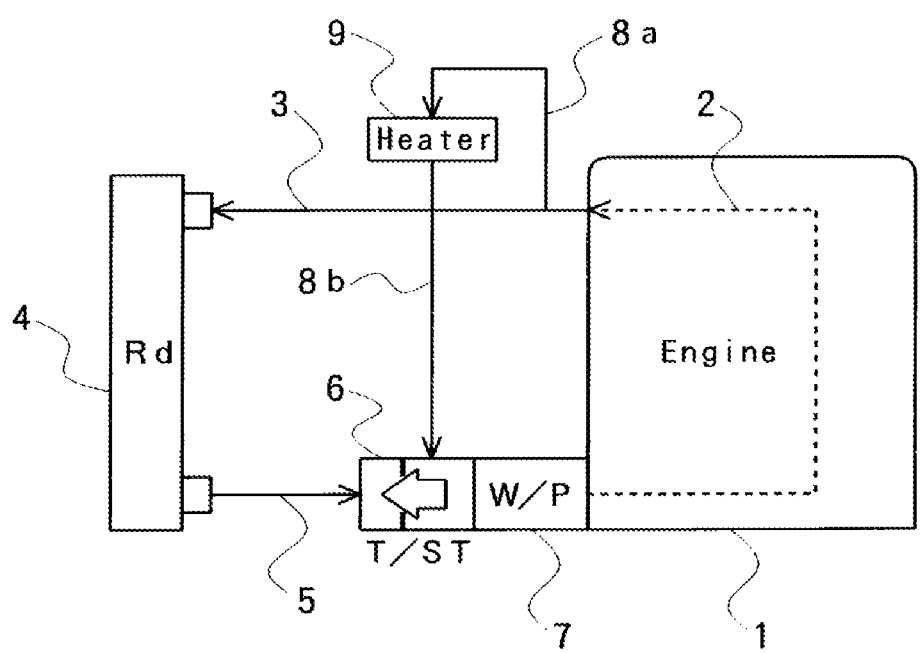
FIG. 1 is a schematic diagram showing the whole cooling apparatus structure of an internal combustion engine in accordance with the present invention.
Figure 2:
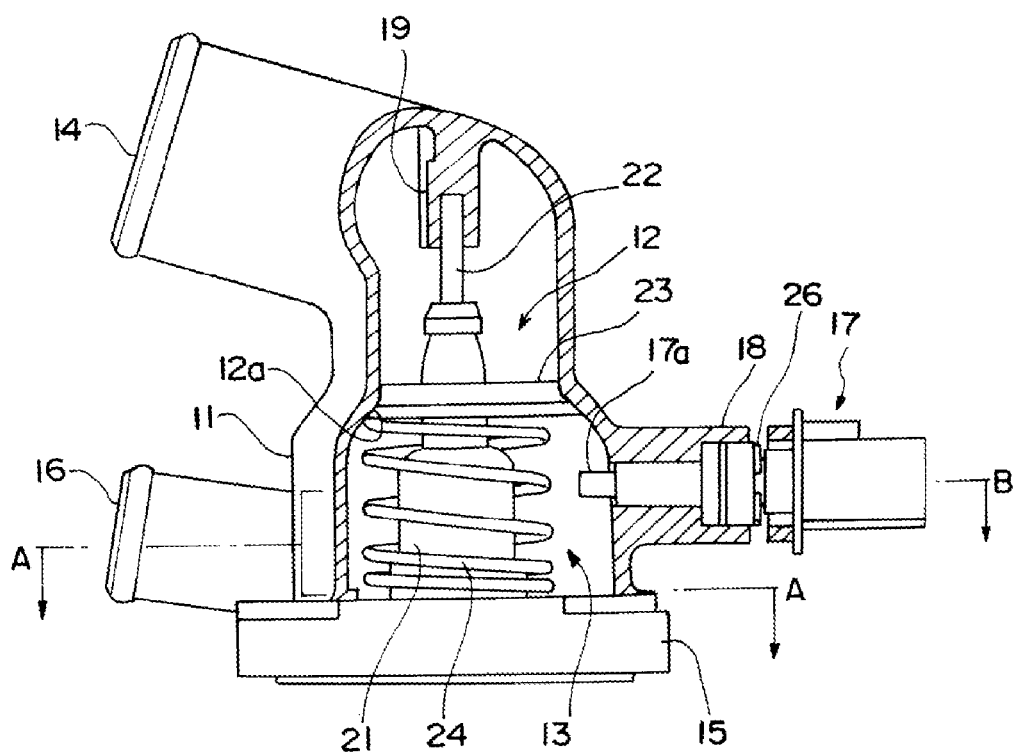
FIG. 2 is a front view showing a casing of a thermostat device partially in cross section.

FIG. 1 shows a preferred embodiment of a cooling apparatus for an internal combustion engine in accordance with the present invention. In FIG. 1, reference numeral 1 indicates an internal combustion engine (engine) schematically. As is well known, a water jacket 2 which is a fluid passage is formed in this engine 1. Further, a coolant flowed out of an outlet part (engine coolant outlet) of the fluid passage 2 enters a radiator 4 through a feeder channel 3 for feeding the coolant, and the coolant which has dissipated its heat by the radiator 4 flows into a thermostat device 6 through a return channel 5.

As will be described later, a housing which constitutes the above-mentioned thermostat device 6 is arranged at the upstream side of a water pump (W/P) 7 for feeding the coolant into the engine and the above-mentioned water pump 7 is driven to circulate the coolant.

Further, it is arranged that the coolant is partly supplied to a heater core part 9, used as a heat exchanger for room heating, from an engine coolant outlet through a branch channel 8a, and returned to the above-mentioned thermostat device 5 from the heater core part 9 through a channel 8b. In other words, the channels 8a and 8b in the cooling apparatus shown in FIG. 1 also function as by-pass passages for the coolant which flows not via the above-mentioned radiator 4.

As shown in FIGS. 2-6, the above-mentioned thermostat device 6 is arranged such that a housing 11 which constitutes an outer portion is moulded from a synthetic resin and a thermoelement assembly 13 is incorporated in a circulation hole 12 in the center of the housing 11. An inlet 14 through which the coolant from the above-mentioned radiator 4 side flows is formed at an upper end of the above-mentioned housing 11. This inlet 14 is arranged so as to be inclined with respect to an axis of the circulation hole 12 in the housing in a position where the above-mentioned thermoelement assembly 13 is accommodated.

Figure 3:
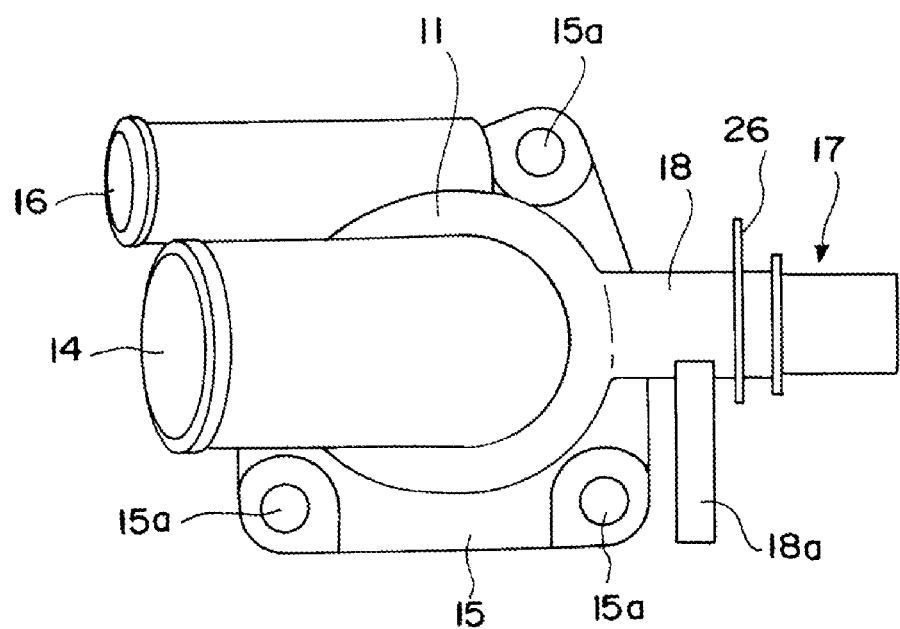
FIG. 3 is a plan view of the thermostat device.
Figure 4:
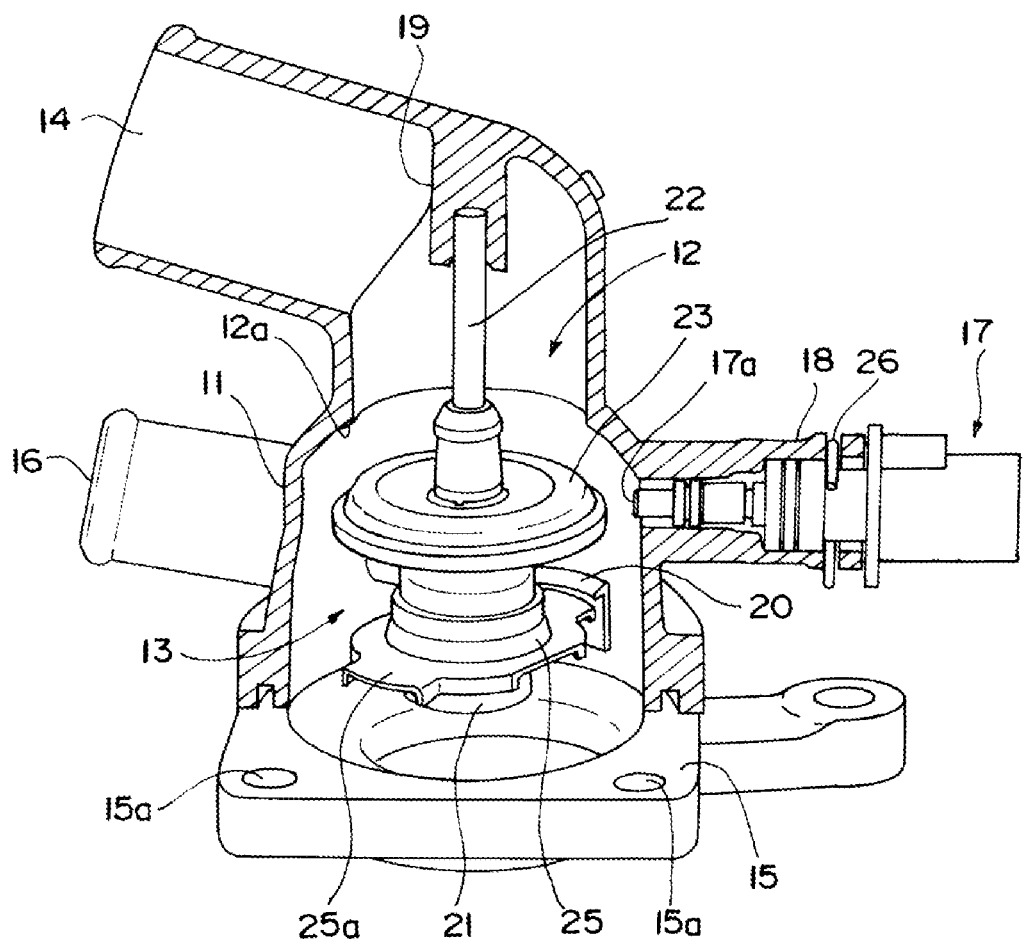
FIG. 4 is a perspective view showing the thermostat device where a first half part of the casing is cut away and a spring member is removed.
Figure 5:
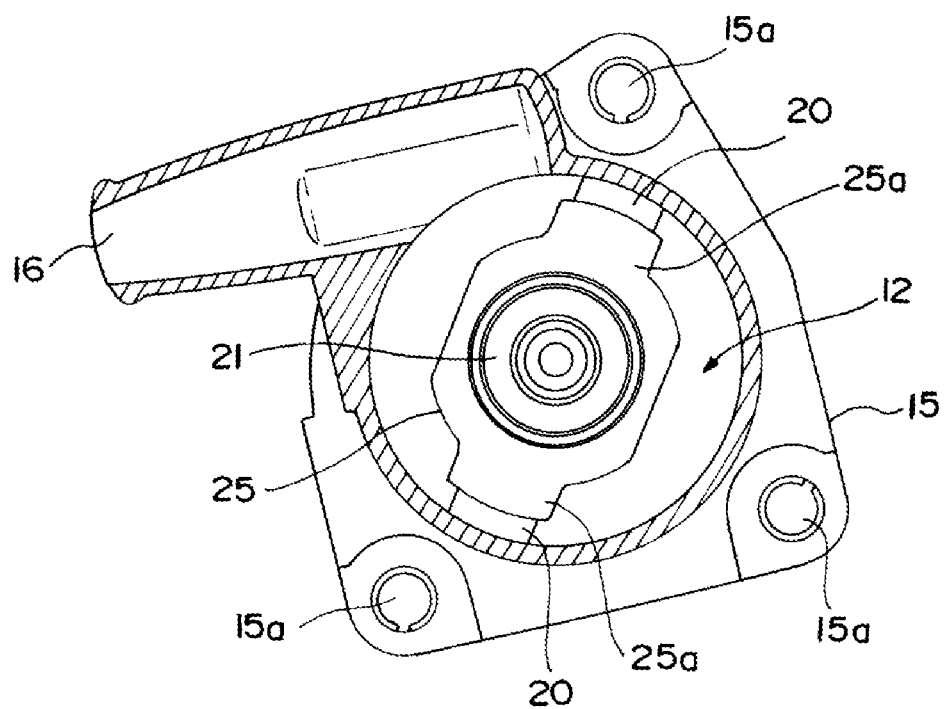
FIG. 5 is a sectional view taken along line A-A in FIG. 2 in the direction of arrows, where the spring member is removed.

As shown in FIG. 3, a base of the above-mentioned housing 11 is arranged such that a flange part 15 which can be directly fixed to the above-mentioned water pump 7 is formed and a bolt insertion hole 15a for attachment is formed in the above-mentioned flange part 15.

Further, a fluid inlet 16 for supplying the coolant which flows through the above-mentioned heater core part 9 from the engine coolant outlet not via the above-mentioned radiator is formed integrally with the above-mentioned housing 11. This fluid inlet 16 is formed in the same direction as an inclined direction of the inlet 14 for the coolant from the above-mentioned radiator 4 side, and the above-mentioned fluid inlet 16 communicates with the circulation hole 12 of the housing between a valve body and a frame support part which constitute the thermoelement assembly 13 to be set forth later.

A support tube 18 which supports a temperature sensor 17 to be set froth later is formed integrally with the above-mentioned housing 11. The support tube 18 of this temperature sensor is formed extending in a direction opposite to each of the inclined directions of the inlet 14 through which the coolant from the above-mentioned radiator 4 side flows and the fluid inlet 16 for the coolant flowed via the heater core part 9.

The thermoelement assembly 13 incorporated in the circulation hole 12 in the center of the above-mentioned housing 11 is provided with a thermoelement 21 including therein a thermal expansion material (wax) which expands and contracts in response to a temperature of the coolant, and it acts so that a piston 22 may expand by expansion of the above-mentioned thermal expansion material. A tip portion of the above-mentioned piston 22 is fitted into a long hole formed at a supporting part 19 which is formed to project toward the circulation hole 12 within the housing 11.

Further, a disc-shaped valve body 23 is attached to the above-mentioned thermoelement 21. This valve body 23 comes into abutment with a valve seat 12a formed by somewhat reducing an internal diameter at the above-mentioned circulation hole 12, thus closing the valve. The spring member 24 is arranged so that one end may come into contact with the above-mentioned valve body 23, and the other end of the above-mentioned spring member 24 is supported by the spring support frame 25 shown in FIGS. 4 and 5, whereby the above-mentioned valve body 23 is biased in a direction to close by the action of the spring member 24.

The above-mentioned spring support frame 25 is arranged such that a pair of lock portions 25a are formed to project at horizontally opposite positions so as not to increase flow resistance in the circulation hole 12 of the housing 11. Further, it is arranged that the above-mentioned lock portions 25a are locked to the frame support parts 20 formed in the circulation hole 12 of the above-mentioned housing 11 so that the above-mentioned thermoelement assembly 13 is incorporated in the above-mentioned housing 11.

According to the above-mentioned thermoelement assembly 13, as the temperature of the coolant rises, the thermal expansion material included in the thermoelement 21 expands so as to expand the above-mentioned piston 22. Thus, the valve body 23 attached to the thermoelement 21 relatively moves so as to open the valve, and the temperature control of the coolant is carried out in a well known manner.

Figure 6:
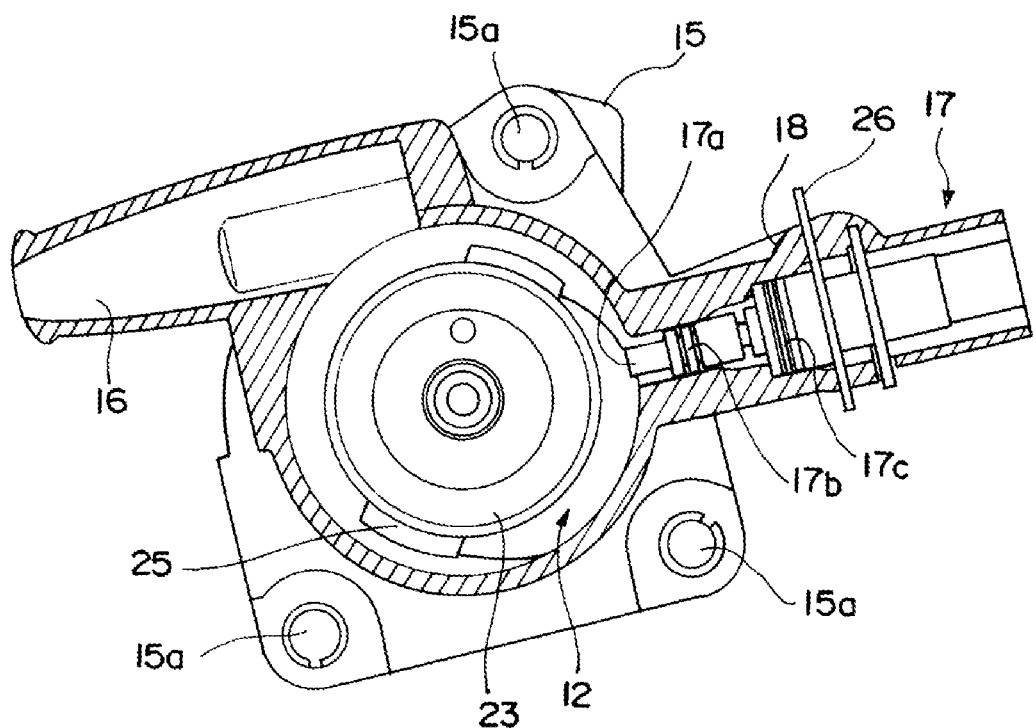
FIG. 6 is a sectional view taken along line A-B in FIG. 2 in the direction of arrows, where the spring member is removed.

Further, the above-mentioned temperature sensor 17 is fitted into the support tube 18 formed at the above-mentioned housing 11 so as to be detachable in an axial direction, and locked with a clip 26. As shown in FIG. 6, the above-mentioned temperature sensor 17 is provided with a temperature detector 17a at its tip, moulded from a resin as a whole, and mounted so as to seal the housing 11 by means of O rings 17b and 17c fitted around the sensor.

Therefore, the above-mentioned sealing state can be cancelled by unlocking the above-mentioned clip 26 and somewhat pulling the above-mentioned temperature sensor 17 out of the inside of the above-mentioned support tube 18 in the axial direction. Thus, as described above, it can also serve the function to remove air at the time of filling the coolant into the circulation channel.

Further, it may also function as a drain cock at the time of draining the coolant from the above-mentioned circulation channel in order to change the coolant. In addition, the drain work of the coolant can be smoothly accomplished by forming a drain pipe 18a for the coolant so that it may be perpendicular to the support tube 18, as shown in FIG. 3.

According to the above-mentioned preferred embodiment, the temperature detecting tip 17a of the temperature sensor 17 is arranged in the circulation hole 12 of the housing between the valve body 23 which constitute the thermoelement assembly 13 and the frame support part 20, so as to be away from the above-mentioned spring support frame 25. Further, the temperature detecting tip 17a is arranged at a location where the fluid inlet 16 through which the coolant flowed via the above-mentioned heater core part 9 flows and the circulation hole 12 communicate with each other, and it is arranged to face the inside of the above-mentioned circulation hole 12 opposite the inclined direction of the above-mentioned fluid inlet 16 about the thermoelement 21.

According to the above-mentioned arrangement of the temperature detecting tip 17a, it is possible to obtain operational effects except for those described in the above-mentioned column of "Effects of the Invention". For example, a coolant temperature can be measured in a position where the coolant from the radiator 4 and the coolant flowed via the heater core part 9 from the engine outlet are mixed, so that the temperature of the coolant around the thermostat can be detected correctly. Furthermore, in the case where the thermostat is arranged directly at the engine, the temperature of the coolant flowing into the engine can be detected correctly.

In addition, in the above-mentioned preferred embodiment, the fluid inlet 16 through which the coolant flowed via the heater core part 9 flows is formed in the same direction as the inclined direction of the inlet 14 of the coolant from the radiator 4 side. However, both the inlets may not necessarily be inclined in the same direction.

Further, in the above-mentioned preferred embodiment, the support tube 18 which supports the temperature sensor 17 is formed extending in a direction opposite to each of the inclined directions of the inlet 14 through which the coolant from the above-mentioned radiator 4 side flows and the fluid inlet 16 for the coolant flowed via the heater core part 9. However, it is not necessary either to arrange the formation direction of this support tube 18 to be opposite to both the above-mentioned inclined directions.

What is claimed is:

1. A cooling apparatus for an internal combustion engine in which a circulation channel of a coolant is formed between a fluid passage formed in the internal combustion engine, a radiator and said cooling apparatus, said cooling apparatus comprising:

a housing including a circulation hole having a frame support part formed therein, a thermoelement including therein a thermal expansion material which expands and contracts in response to a temperature of the coolant, a valve body which opens and closes the circulation hole in said housing based on expansion and contraction of the thermal expansion material in said thermoelement, a spring member which biases said valve body in a direction to close the valve, and a spring support frame which supports an end of said spring member, the spring support frame including a lock portion which is locked to the frame support part formed in the circulation hole of said housing; and a temperature sensor having a temperature detecting tip arranged perpendicular to a flow direction in the circulation hole, arranged to face the inside of the circulation hole of the housing at a position between said valve body and said frame support part, and arranged to be away from said spring support frame, wherein positions of the temperature detecting tip and the lock position projected from said spring support frame are arranged not to overlap each other when viewed along the flow direction in the circulation hole, wherein said housing includes an inlet for coolant from said radiator, wherein said temperature detecting tip of said temperature detector is disposed at a position opposite an inlet for coolant not from said radiator, relative to an axis of said circulation hole, and wherein said temperature detecting tip of said temperature sensor faces the inside of said circulation hole at a position of said housing which is opposite said inlet for coolant from said radiator, relative to an axis of said circulation hole.

2. The cooling apparatus for the internal combustion engine as claimed in claim 1, wherein said inlet for coolant not from said radiator communicates with said circulation hole at a position between said valve body and said frame support part.

3. The cooling apparatus for the internal combustion engine as claimed in claim 1, wherein said housing includes a support tube for said temperature sensor, said temperature sensor being fitted into said support tube so as to be detachable in an axial direction of said support tube.

4. A cooling apparatus for an internal combustion engine in which a circulation channel of a coolant is formed between a fluid passage formed in the internal combustion engine, a radiator and said cooling apparatus, said cooling apparatus comprising:

a housing including a circulation hole having a frame support part formed therein, a thermoelement including therein a thermal expansion material which expands and contracts in response to a temperature of the coolant, a valve body which opens and closes the circulation hole in said housing based on expansion and contraction of the thermal expansion material in said thermoelement, a spring member which biases said valve body in a direction to close the valve, and a spring support frame which supports an end of said spring member, the spring support frame including a lock portion which is locked to the frame support part formed in the circulation hole of said housing; and a temperature sensor having a temperature detecting tip arranged perpendicular to a flow direction in the circulation hole, arranged to face the inside of the circulation hole of the housing at a position between said valve body and said frame support part, and arranged to be away from said spring support frame, wherein positions of the temperature detecting tip and the lock position projected from said spring support frame are arranged not to overlap each other when viewed along the flow direction in the circulation hole, wherein said housing includes an inlet for coolant from said radiator, wherein said temperature detecting tip of said temperature detector is disposed at a position opposite an inlet for coolant not from said radiator, relative to an axis of said circulation hole, and wherein said housing includes a support tube for said temperature sensor, said temperature sensor being fitted into said support tube so as to be detachable in an axial direction of said support tube.

5. The cooling apparatus for the internal combustion engine as claimed in claim 4, wherein said inlet for coolant not from said radiator communicates with said circulation hole at a position between said valve body and said frame support part.

6. A cooling apparatus for an internal combustion engine in which a circulation channel of a coolant is formed between a fluid passage formed in the internal combustion engine, a radiator and said cooling apparatus, said cooling apparatus comprising:

a housing including a circulation hole having a frame support part formed therein, a thermoelement including therein a thermal expansion material which expands and contracts in response to a temperature of the coolant, a valve body which opens and closes the circulation hole in said housing based on expansion and contraction of the thermal expansion material in said thermoelement, a spring member which biases said valve body in a direction to close the valve, and a spring support frame which supports an end of said spring member, the spring support frame including a lock portion which is locked to the frame support part formed in the circulation hole of said housing; and a temperature sensor having a temperature detecting tip arranged perpendicular to a flow direction in the circulation hole, arranged to face the inside of the circulation hole of the housing at a position between said valve body and said frame support part, and arranged to be away from said spring support frame, wherein positions of the temperature detecting tip and the lock position projected from said spring support frame are arranged not to overlap each other when viewed along the flow direction in the circulation hole, wherein said housing includes an inlet for coolant from said radiator, wherein said temperature detecting tip of said temperature detector is disposed at a position opposite an inlet for coolant not from said radiator, relative to an axis of said circulation hole, and wherein said inlet for coolant not from said radiator communicates with said circulation hole at a position between said valve body and said frame support part.

* * * * *